United States Patent [19]

Gent et al.

[11] 4,132,304

[45] Jan. 2, 1979

[54] ARTICLE COUNTING APPARATUS

[75] Inventors: Ernest C. Gent, Wisbech; Stephen R. Watson, King's Lynn, both of England

[73] Assignee: A. E. Lenton (Wisbech) Limited, Lincolnshire, England

[21] Appl. No.: 723,029

[22] Filed: Sep. 13, 1976

Related U.S. Application Data

[63] Continuation-in-part of Ser. No. 633,027, Nov. 18, 1975.

[30] Foreign Application Priority Data

Nov. 28, 1974 [GB] United Kingdom ............... 51544/74
Jul. 10, 1975 [GB] United Kingdom ............... 29138/75

[51] Int. Cl.[2] ............................................. B65G 47/26

[52] U.S. Cl. .................................... 198/432; 198/447; 198/697; 198/698

[58] Field of Search ............... 198/418, 425, 426, 443, 198/697, 698, 699, 503, 432, 447; 221/9, 13, 21

[56] References Cited

U.S. PATENT DOCUMENTS

| | | | |
|---|---|---|---|
| 490,608 | 1/1893 | Hutchinson | 198/697 X |
| 1,812,287 | 6/1931 | Davis | 198/692 |
| 1,870,201 | 8/1932 | Dietmann | 198/445 |
| 2,910,165 | 10/1959 | Byington | 198/392 |
| 3,483,962 | 12/1969 | Spershott et al. | 198/432 |
| 3,621,900 | 11/1971 | Rood | 198/393 |
| 3,828,916 | 8/1974 | Patz | 198/457 |

*Primary Examiner*—Evon C. Blunk
*Assistant Examiner*—Douglas D. Watts
*Attorney, Agent, or Firm*—Oblon, Fisher, Spivak, McClelland & Maier

[57] ABSTRACT

A counting and grouping apparatus for receiving articles such as fruit, marshalling the articles so as to fill up a number of parallel supply lines for presenting a number of the articles in line abreast in the leading positions in the supply lines, the number in the line abreast being equal to (or a fraction or multiple of) the number of articles to be counted into a group and a moving belt conveyor bearing at intervals along its length lines of fingers in line abreast across the belt, which fingers align with the leading position of the supply lines and shift the line of articles in said leading positions onto the conveyor belt as the fingers pass the exit ends of the supply lines. Gates are described for blocking one or more of the supply lines to control the number.

The fingers have an upright operating position for picking off the articles and a non-operating position folded down on to the belt. The number in the final group can thus be varied by adjusting the number of fingers in each line which are in an operating position. Each group is collated from line abreast into a serial sequence for presentation to subsequent handling equipment.

16 Claims, 10 Drawing Figures

ARTICLE COUNTING APPARATUS

REFERENCE TO RELATED APPLICATION

This application is a Continuation-In-Part Application of U.S. application Ser. No. 633,027, filed Nov. 18, 1975.

BACKGROUND OF THE INVENTION

1. Field of the Invention:

This invention concerns article counting apparatus particularly but not exclusively designed for counting citrus fruits into groups containing a selected number of fruits.

The invention is of particular application in the food packaging industry where it is often desired to count fruit or vegetables into groups having equal numbers of the fruit or vegetables in each group ready for packaging either in plastic bags or in the case of citrus fruit, in netting.

2. Description of the Prior Art:

Equipment is available for packaging collated articles provided the required number of articles are presented to the equipment for each packaging operation. It is thus necessary to collate or count articles into groups for presentation to such equipment.

SUMMARY OF THE INVENTION

It is an object of the present invention to provide a counting and collating system for feeding citrus fruits to a fruit netting machine of the type manufactured by Spang Brands of Overusel, West Germany. It is to be understood however that this application is only cited by way of example and the equipment to be described in this specification is of general application in the counting and collating of articles of similar general shape and substantially similar size.

According to the present invention apparatus for counting articles supplied thereto and releasing said articles in groups having the same number of articles in each group is characterised by means for supplying the said articles to a grouping station, a plurality of guides at said grouping station for separating the articles into a plurality of lines and conveyor means having article counting fingers in line across the conveyor means for removing from the first position in each said line of articles the foremost articles in the lines and conveying the articles so collated to a collating device for dispensing the articles in the group in sequence instead of line abreast.

The means for supplying the articles to the grouping station may simply comprise a hopper with or without an escapement mechanism for maintaining filled the lines of articles formed by the grouping station or a conveyor belt forming the end of a processing line of, for example, a fruit grading facility in which fruit are sorted either automatically or by hand and according to size deposited on two or more different conveyor belts which then, for example, supply separate grouping stations of separate article counting apparatus according to the invention.

The grouping station may comprise a moving belt which cooperates with guides to assemble the articles in lines between the guides ready for the articles in the leading positions to be removed by the article engaging fingers on the conveyor means.

Alternatively, and preferably, the grouping station may comprise an inclined tray having guides which overlie or are integrally formed with the tray and the articles are deposited onto the upper end of the tray so as to roll down the paths defined by the guides so as to form the said lines of articles.

Each article path through the grouping station may include as a part thereof a stretched endless belt which is driven so as to move in the direction in which the articles are to move through the grouping station. In this way the passage of articles is assisted.

Tufts of bristles may be located at intervals along each of said endless belts and each belt is preferably located so that the bristles make a gentle rubbing contact with the underside of the articles in the grouping station to gently agitate the articles therethrough.

According to a further aspect the grouping station may comprise a tray formed from a plurality of pairs of parallel rails along which the articles can roll and between each pair of which is located the said endless belt bearing the tufts of bristles. By rigidly joining the pairs of rails together, the integral unit can be raised or lowered relative the endless belts to increase or decrease the contact with the articles by the belts and/or bristles.

Preferably the conveyor means comprises a conveyor belt having mounted thereon upstanding fingers in line abreast across the conveyor belt spaced along the length thereof. Typically the lateral spacing between the fingers is less than the normally expected diameter or lateral dimension of any of the articles the apparatus is likely to be expected to handle.

The conveyor means may be horizontal or vertical or may be inclined thereto.

According to another aspect of the present invention, the width of the conveyor means bearing the article engaging fingers in line thereacross can be reduced for any given number of articles to be counted, by arranging the lines of article engaging fingers in groups of n (where n is two or more) and arranging that the collating means is responsive to articles from n successive lines across said conveyor means to form the collated group. Thus, if the apparatus is to be capable of counting ten articles, this can be achieved either by using a conveyor of sufficient width to allow ten article engaging fingers to be arranged in a single line thereacross, or a conveyor of half that width may be used with the ten fingers arranged in two rows of five. Each two rows of five fingers may be spaced along the length of the conveyor belt by a relatively short distance compared to the spacing along the length of the conveyor belt between one pair of rows and the next.

According to another aspect of the present invention, the number of articles in a group may be varied by providing that each article engaging finger can occupy a first upright position for removing articles from the grouping station or can be lowered to a second non-operative position in which no articles will be removed by that finger from the grouping station. By using this facility, one or more of the article engaging fingers in a line across the conveyor can be rendered inoperative so as to reduce the number of articles which that line will pick up so that just the required number of articles will be formed in each group.

According to a further aspect of the present invention, tunnel guards are provided over at least some of the length of each path through the apparatus to reduce the risk of accident and loss of articles as by falling off. Conveniently a separate guard is provided for each line of articles across the width of the conveyor and preferably the plurality of guards so required are linked together so as to form an integral unit which can be mounted on and demounted from the apparatus. Preferably the mounting allows for adjustment of the height of the guard relative to the particular part of the article conveying path over which the guard lies.

According to another aspect of the invention, weight sensitive switch means is provided in each path between the guides and an electrical mechanical interlock is provided to either inhibit the release of articles to the conveyor means or to stop the conveyor means and/or generate an alarm signal.

Means may be provided for adjusting the lateral spacing between the guides in the grouping means to alter the width of the paths along which the articles are constrained to travel. This adjustment may be by way of removing alternate ones of said guides or by replacing an integrally formed array of guides with another integrally formed array.

Preferably means is provided for rendering non-operational selected ones of the paths formed by the guides. This may be achieved by preventing the establishment of selected ones of the lines of articles or gate means may be provided at the exit end of each said path to optionally allow articles from that path to pass to the conveyor means or to be inhibited from so passing.

Where the conveyor means supplies articles to a following machine for automatically packaging the articles, sensing means is preferably provided adjacent the said second conveyor means to determine when articles are carried thereon to generate an electrical or other suitable signal for indicating to the following machine that a group of articles will shortly be presented thereto for packaging. In this way the following machine can be rendered quiescent except when called into operation by a signal from the sensing means.

BRIEF DESCRIPTION OF THE DRAWINGS

The invention will now be described by way of example with reference to the accompanying drawings in which.

Figure 1:
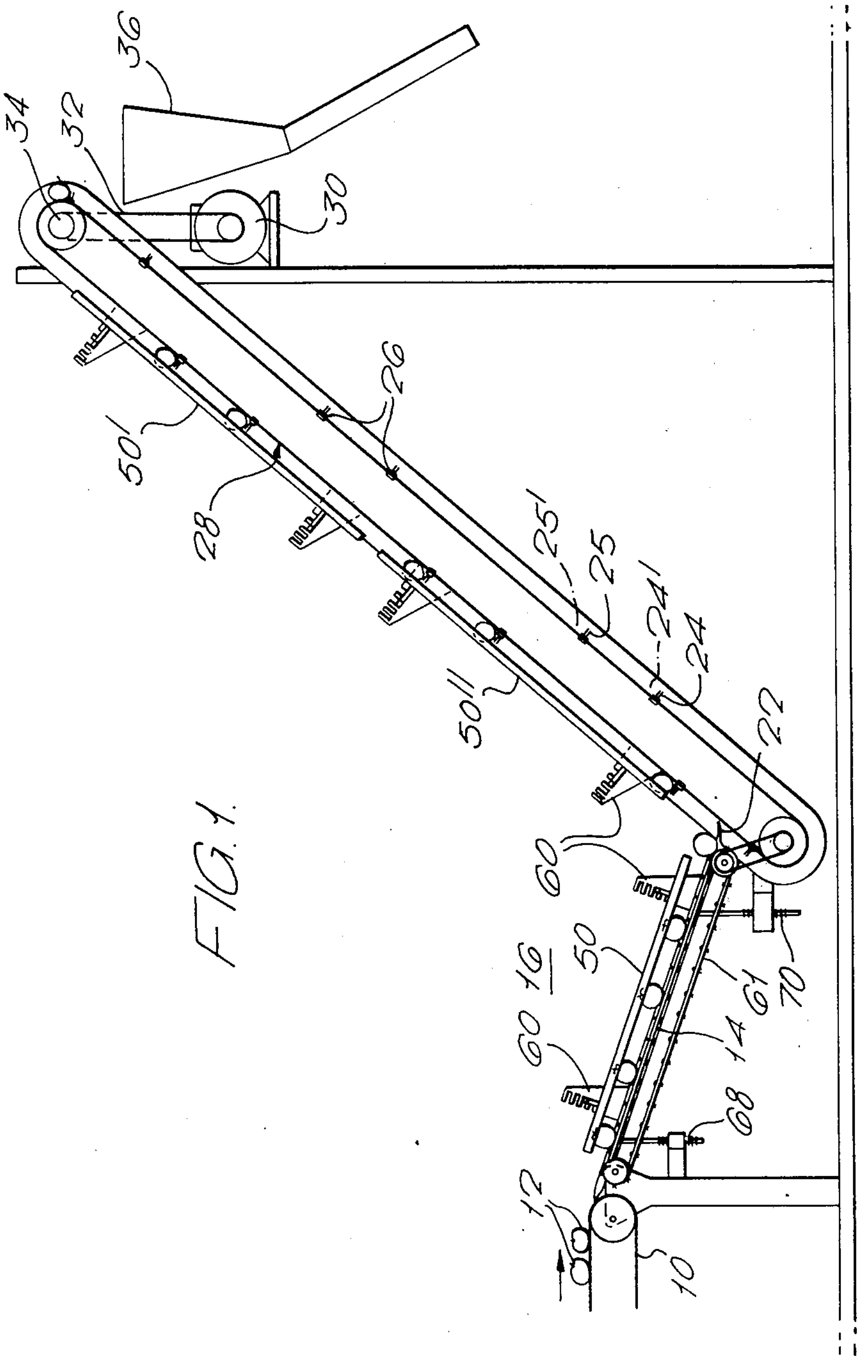
FIG. 1 is a side elevation of one embodiment of the invention as applied to apparatus for grouping fruit into groups of known size.

It is to be understood that the embodiment illustrated in the drawings is one example only of a realization of the invention and it is not limited to this particular form of construction.

DESCRIPTION OF A PREFERRED EMBODIMENT

Figure 2:
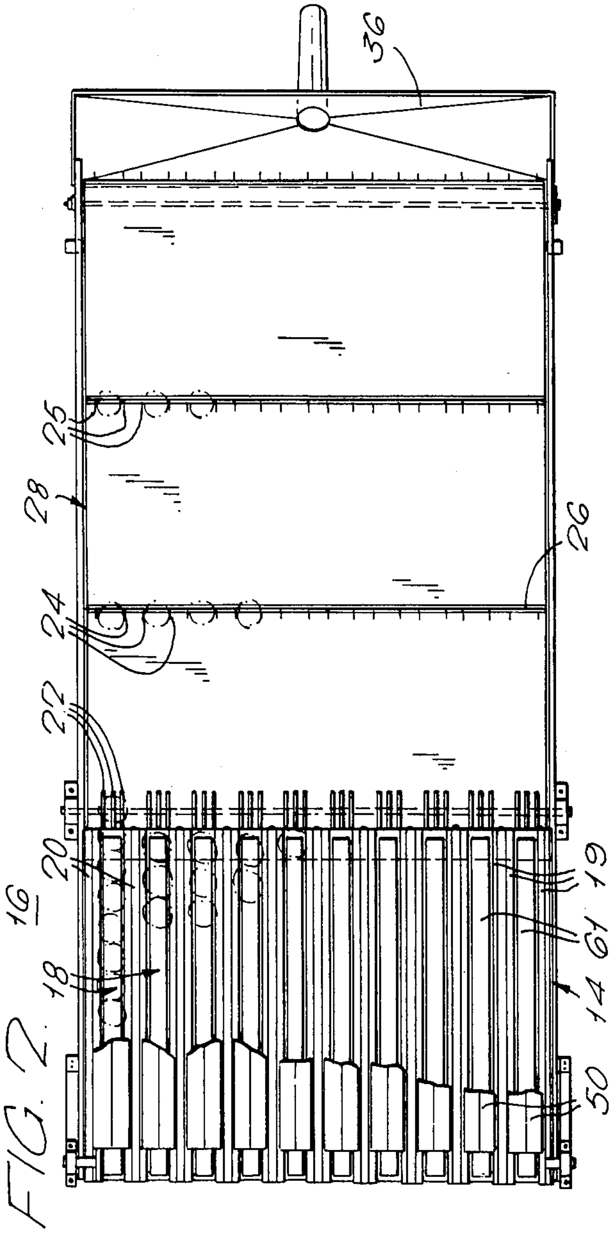
FIG. 2 is a plan view of the apparatus of FIG. 1 with various covers etc. removed.

Referring to the drawings and in particular FIGS. 1 and 2, there is shown a feed conveyor 10 on which fruit 12 are deposited following initial sorting by hand. The conveyor 10 presents the fruit to the upper end of a tray 14. The feed conveyor 10 does not necessarily form part of the invention and can be replaced by a hopper (not shown) for supplying fruit to the upper end of the tray 14.

The tray 14 is better seen in the plan view of FIG. 2 from which it will be seen that the tray is divided into ten parallel paths 18 by a series of parallel guides 20 which extend over the length of the tray. The spacing between the guides 20 is chosen to correspond with the maximum diameter of the fruit which is likely to be presented to the tray. Likewise the number of paths for the fruit through the tray 14 is made equal to the number of fruit required in the final group to be obtained from the machine (or to a sub-multiple thereof). Where a fixed tray is provided, the variation in the number of paths is most simply obtained by blocking off one or more of the paths. Alternatively, although not shown, means may be provided for preventing the exit of fruit from the lower end of the tray 14 from certain ones of the paths 18.

Along the lower edge of the tray and at the lower end of each of the paths 18 are located fingers of wire 22 which extend in the direction of the paths and act as a catchment for the fruit which roll down the paths 18. As best seen in FIG. 1, each of the fingers 22 is bent to define a shallow V shape so that the lowermost fruit in each path rests in the trough formed by the fingers 22.

Turning now again to FIG. 1, in partcular, the fruit is picked up from a catchment formed by the fingers 22 by means of lines of fingers 24 carried on and upstanding from bars 26 which extend across and form part of a conveyor belt of an elevating conveyor generally designated 28. The fingers 24 can be folded down individually to alter the number of fruit picked up by a line thereof. The transversely extending lines of fingers 24 are spaced apart along the length of the conveyor belt of an elevating conveyor 28 so that the groups of fruit picked up thereon arrive at the upper end of the elevating conveyor at the appropriate frequency to enable the following equipment (not shown in detail) to accommodate them. The speed of the elevating conveyor is thus made adjustable by means of a gear box (not shown) or a variable speed electric motor such as 30. A positive drive is provided between the motor (and/or gear box) by means of a chain drive 32 which extends around a sprocket wheel 34 on the upper shaft of the elevating conveyor.

A chute generally designated 36 is arranged just below the upper end of the elevating conveyor 28 to receive the fruit as it is tipped from the belt as the latter turns around at the upper end of the elevator. Preferably the chute 36 is in the form of a funnel so that the group of fruit which is presented to it in line abreast is then caused to converge and form a single line of fruit for presentation in sequence one fruit at a time to the following equipment (not shown). In this connection, the embodiment described in the drawings is of particular application for feeding citrus fruit to a netting machine as produced by Spang Brands of Oberusel, West Germany.

Figure 3:
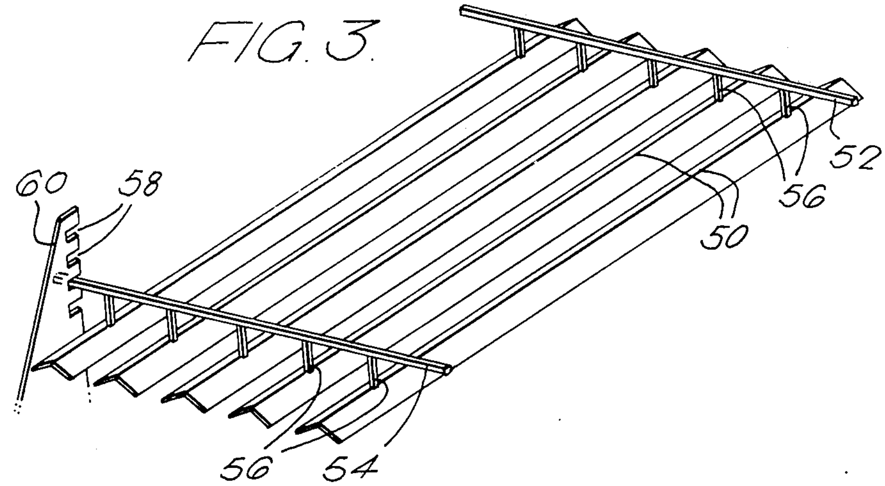
FIG. 3 is a perspective view illustrating one form of multiple cover guards which may be fixed to the FIG. 1 embodiment.

A plurality of cover guards 50 are arranged in a parallel array (see FIG. 3) and suspended above the tray 14 forming the grouping station. One guard 50 is provided for each path across the tray 14 and the guards 50 are suspended from a pair of transverse struts 52 and 54 by means of rigid links 56. The array of guards 50 can thus be handled as a single unit and is adapted to be mounted above the tray 14 by locating the ends of the struts 52 and 54 in open-ended slots 58 formed in the upwardly facing edges of guard supports 60 located at intervals along the length of the tray 14. It will be seen that the unit can be removed from the apparatus simply by lifting in an upward direction so that the ends of the struts 52 and 54 clear the slots 58.

The guards 50 not only serve the purpose of restricting the layers of fruit to single layers but also reduce the risk of injury to machine operators and reduce the risk of fruit loss due to accidental falling off.

It will be seen that the height of the guards 50 above the tray 14 can be adjusted by selecting an appropriate one of the slots 58 in the supports in which to insert the ends of the struts 52 and 54.

Similar cover guards generally designated 50' and 50" are arranged over the elevating conveyor designated 28.

The width of the conveyor belt of the elevating conveyor 28 can be substantially reduced by arranging the ten fingers in two rows of five, as shown in lines 24 and 25 of FIG. 1. In this event the article collating device in the form of the chute 36 and subsequent equipment must be arranged to be responsive to the fruit from two such rows 24 and 25 to form the collated group.

The fingers in each of the lines 24 and 25 can be folded down parallel to the conveyor belt, as shown in dotted outline at 24' and 25' in FIG. 1 hereof, so as not to pick up articles from the grouping station or can be left in their upright position so as to collect articles.

The tray 14 is formed from a plurality of parallel elongate members 19 which constitute rails on which the fruit can roll and in the space between each pair of rails is located an endless belt 61. The belts 61 are driven from the bottom roller of the main elevator 28 and are driven so that the upper section of each belt as viewed in FIG. 1 moves in a generally downward direction and thereby urges the fruit in a downward direction also.

Figure 4:
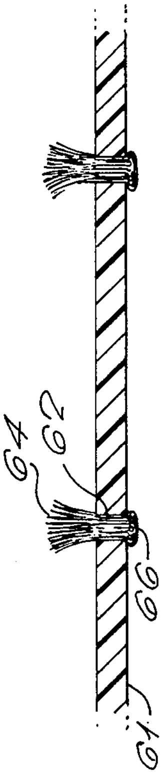
FIG. 4 is a cross-section to an enlarged scale through an endless belt in the article grouping station of the embodiment of FIG. 1.

To assist the agitation of the fruit, the belt is formed with tufts of bristles at intervals along its length and one such tuft is shown in FIG. 4 of the drawings. The tuft of the bristles is inserted into the belt through a hole formed at 62 and the tuft 64 is held therein by means of wire and adhesive on the underside at 66.

Adjustment is provided in the mountings 68, 70 for the tray 14 to allow the latter to be moved up or down relative to the plane of the endless belt 61 so as to increase or decrease contact between the fruit and the belt (and/or bristles).

Figure 5A:
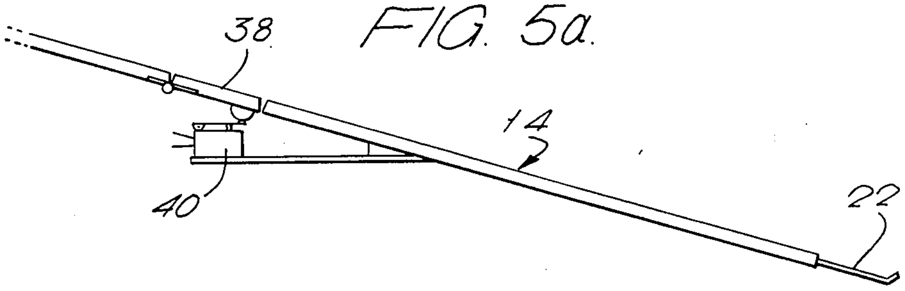
FIG. 5 is a side elevation of part of the apparatus of FIG. 1 together with a circuit diagram indicating an electrical interlock arrangement for preventing operation of the apparatus until a full group of articles is available to be conveyed from the grouping station.
Figure 5B:
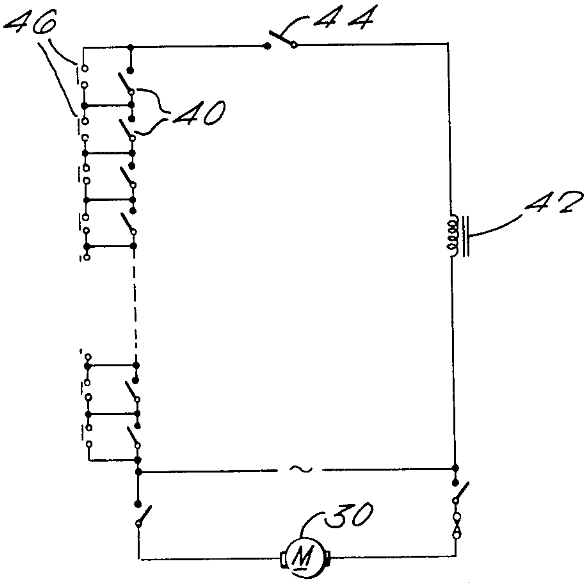

Referring now to FIG. 5*a* and 5*b*, there is shown a modification which may be made to the tray 14 of FIGS. 1 and 2. The modification consists in providing a weight sensitive hinged pressure plate some two-thirds up each of the paths. Each plate 38 is urged slightly proud of the surface of the tray by the action of a microswitch 40 located beneath each path. However, the force exerted in an upward direction on each plate 38 is arranged to be less than the weight component acting in the same direction caused by an article, such as a stationary fruit, located at least in part on the plate 38 and, in that event, the plate 38 will be depressed and the microswitch 40 operated whenever a fruit rests thereon.

As seen from the circuit diagram also seen in FIG. 5, the microswitches across the width of the tray 14 are all connected in series so that the circuit containing them can only be completed when all the microswitches 40 are operated. This can only happen when a fruit is lying above the pressure plate 38 on each of the paths through the grouping station. Unless an oversize fruit has become wedged above the plate 38, this situation can only obtain if each path through the grouping station is completely full of fruit at least up to the point in each path at which the pressure plate 38 is situated. Thus, the electrical circuit which includes the microswitches 40 can only be completed when at least that portion of each of the paths across the tray is full of fruit and the circuit serves to control the supply of electric current to a contactor coil 42 the contacts of which control the supply of operating current to the electric motor 30 which operates the elevating conveyor 28. An on/off switch 44 is also provided in the circuit. The elevating conveyor can thus only be operated by its motor 30 when the tray 14 is suitably filled with fruit ready for despatch on the conveyor 28. As a corollary, if any of the paths on the tray 14 become less full than the point marked by the position of the weight sensing plate 38, the conveyor 28 will stop.

A further refinement is provided by means of a separately operated switch in parallel with each of the normally open microswitches 40. These additional switches are denoted by reference numeral 46 in the circuit diagram. The action of each additional switch 46 is, when closed, to short out the microswitch across which it is connected so that if that microswitch remains open circuit or becomes open circuit, the conveyor motor 30 is not stopped. This is important since, in the event that one or other of the paths 18 is to be blanked off so that no fruit can lie in it, the microswitch for that path will never become operative since no fruit will ever lie above it.

A further refinement comprises the provision of an article sensing mechanism such as a light beam and photocell at a point along the path of the elevating conveyor such that an electrical signal is generated when a line of fruit passes the sensing location. This electrical signal can then be used to set into operation the following equipment (not shown) which can thus be retained in a quiescent state until fruit is about to be delivered from the conveyor 28 and hopper 36.

Figure 6:
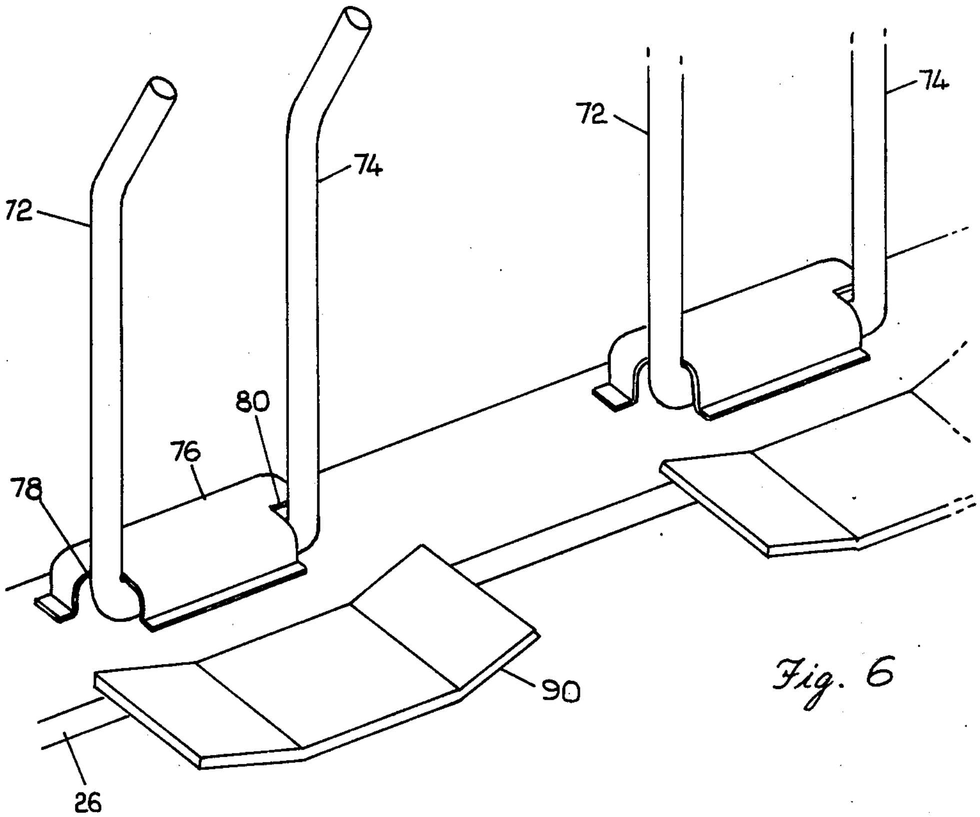
FIG. 6 is a perspective view of a pick-up finger assembly.
Figure 7:
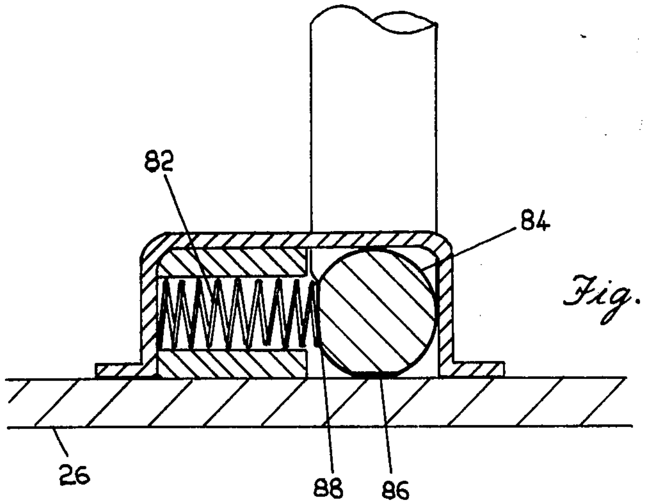
FIG. 7 is a cross-section view of the pick-up finger assembly of FIG. 6.

FIG. 6 and FIG. 7 illustrate a preferred form of hinge joint between the pick-up finger and the belt conveyor 28. The pair of pick-up fingers is in the form of an inverted U and the fingers are generally designated 72 and 74. The bridging section between the two fingers is trapped beneath a housing 76 which forms a hinge cover plate and includes two stops at 78 and 80 to prevent the fingers 72 and 74 from being rotated beyond the upright. They can of course be rotated in the opposite direction away from the stops 78 and 80 to lie flat or substantially flat on the belt.

As best seen in FIG. 7, the housing 76 includes two recesses on its underside in which are fitted two helical springs 82 which act against the bridging section 84 between the two fingers 72 and 74.

The bridging section 84 is milled with two perpendicular flat surfaces at 86 and 88. Rotation of the fingers 72 and 74 so as to lie substantially flat against the belt brings the flat surface 86 into contact with the springs 82 and rotation of the fingers into their upright position bring the flat surface 88 into contact with springs 82, as shown in FIG. 7. The action of the flat surfaces and the springs 82 is to hold the fingers in the two selected positions, i.e. either parallel to the belt or substantially perpendicular thereto.

In front of the pair of fingers 72 and 74 and secured to the bar 26, which extends across the conveyor belt, is fitted a cupped metal plate generally designated 90 which serves to locate the fruit in front of the fingers 72 and 74 and constrain the fruit laterally so as to prevent them from slipping from one side to the other during the passage along the conveyor. In this way a fruit is more securely held in position during its passage along the conveyor belt.

Figure 8:
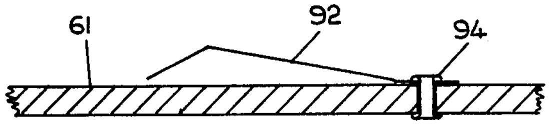
FIG. 8 is a side view of a spring finger modification to the belts 61.
Figure 9:
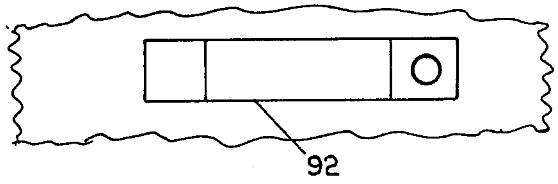
FIG. 9 is a plan view of the spring finger modification of FIG. 8.

A further modification is available to the conveyor belt 61 as shown in FIG. 1. This conveyor belt serves to remove fruit from the feed conveyor 10 and urge them into contact with the endless belt 28. It is important the fruit are continually urged into contact with the conveyor belt 28 and to this end the belt 61 is provided with spring fingers, as shown in FIGS. 8 and 9, comprising a piece of resilient metal shaped in a shallow V and designated by reference numeral 22 which is secured by means of a screw or other means such as a rivet at 94 to the belt 61. The resilience of the metal finger 92 is such that when it comes into contact with a heavy fruit lying on the belt the finger is generally flattened against the belt 61. However, the force required to flatten the finger 92 is sufficient when converted into a component parallel to the belt to produce a force acting on the fruit in the direction of movement of the belt to urge the fruit towards the conveyor 28. The spring fingers 92 are arranged in long lines across the belt at intervals along the length thereof so that as the belt rotates the fruit carried on the belt 61 are continually subjected to this force urging the fruit towards the conveyor 28 as each line of fingers comes into contact with the lines of fruit.

Obviously, numerous modifications and variations of the present invention are possible in light of the above teachings. It is therefore to be understood that within the scope of the appended claims, the invention may be practiced otherwise than as specifically described herein.

We claim:

1. Apparatus for counting articles supplied thereto and releasing said articles in groups having the same number of articles in each group, comprising in combination:
   - means for supplying the said articles to a grouping station;
   - a plurality of guides at the grouping station separating the articles into a corresponding plurality of lines:
   - endless belt conveyor means, having mounted thereon upstanding fingers in lines abreast across the belt, the lines being spaced apart along the length of the belt, for removing from a first position in each of said lines of said articles the foremost articles in the lines and conveying the articles so collected to a collating device for dispensing the grouped articles in sequence instead of line abreast;
   - each of said upstanding fingers being hingably mounted to said endless belt conveyor means to occupy and be held in one of two selected positions, a first upright position in which an article at the first position of a line of articles in said grouping station will be removed by a finger as it passes the station and a second non-operative position in which a finger is in a lowered position parallel to the surface of the said endless belt so that it will not pick up an article as the grouping station is passed such that the width of the endless belt conveyor means bearing the upstanding fingers in line thereacross can be reduced for any of a number of articles to be counted; and
   - means for driving said endless belt conveyor means.

2. Apparatus as set forth in claim 1 wherein the grouping station comprises an inclined tray and the guides overlie the tray.

3. Apparatus as set forth in claim 1 comprising, in combination, a stretched endless belt and means for driving the belt so that it moves in the direction in which the articles are to move through the grouping station, each belt forming part of the article path through the grouping station.

4. Apparatus as set forth in claim 1 further comprising, in combination, tunnel guards over at least some of the length of the path through the apparatus.

5. Apparatus as set forth in claim 1 further comprising, in combination, weight sensitive switch means in each path through the grouping station, said weight sensitive switch means being adapted to generate a signal to stop the conveyor and generate an alarm signal in the absence of articles on the grouping station.

6. Apparatus as set forth in claim 1 wherein the guides are at least movable so as to be adjustable in position to alter the width of the article paths through the grouping station.

7. Apparatus as set forth in claim 1 in which the upstanding fingers are supported on a rigid bar itself attached to the endless belt.

8. Apparatus for counting articles supplied thereto and releasing said articles in groups having the same number of articles in each group, comprising in combination:
   - means for supplying the said articles to a grouping station;
   - a plurality of guides at the grouping station separating the articles into a corresponding plurality of lines;
   - endless belt conveyor means, having mounted thereon upstanding fingers in lines abreast across the belt, the lines being spaced apart along the length of the belt, for removing from a first position in each of said lines of said articles the foremost articles in the lines and conveying the articles so collected to a collating device for dispensing the grouped articles in sequence instead of line abreast;
   - each of said upstanding fingers being hingably mounted to said endless belt conveyor means to occupy one of two positions, a first upright position in which an article at the first position of a line of articles in said grouping station will be removed by a finger as it passes the station and a second non-operative position in which a finger is in a lowered position parallel to the surface of the said endless belt so that it will not pick up an article as the grouping station is passed; and,
   - means for driving said endless belt conveyor means, further comprising, in combination, a stretched endless belt and means for driving the belt so that it moves in the direction in which the articles are to move through the grouping station, each belt forming part of the article path through the grouping station, and, in combination, tufts of bristles which are located at intervals along each of said stretched endless belts, and means for positioning each belt so that the bristles make a gentle rubbing contact with the underside of articles in the grouping station to gently agitate the articles therethrough.

9. Apparatus as set forth in claim 8 wherein the grouping station comprises a tray formed from a plurality of parallel rails along which the articles can roll and between each pair of which is located one of said endless belts bearing the tufts of bristles.

10. Apparatus as set forth in claim 9 further comprising, in combination, means for adjusting the tray relative to the endless belts to control the contact between the articles and the belts and bristles.

11. Apparatus as set forth in claim 3 wherein said upstanding fingers further comprise spring-biased fingers on the stretched endless belt tending to urge articles in the desired direction through the grouping station and further comprising article engaging fingers serving as a catchment for articles or the end of the grouping station.

12. Apparatus for counting articles supplied thereto and releasing said articles in groups having the same number of articles in each group, comprising in combination:

means for supplying the said articles to a grouping station;

a plurality of guides at the grouping station separating the articles into a corresponding plurality of lines;

endless belt conveyor means, having mounted thereon upstanding fingers in lines abreast across the belt, the lines being spaced apart along the length of the belt, for removing from a first position in each of said lines of said articles the foremost articles in the lines and conveying the articles so collected to a collating device for dispensing the grouped articles in sequence instead of line abreast;

each of said upstanding fingers being hingably mounted to said endless belt conveyor means to occupy one of two positions, a first upright position in which an article at the first position of a line of articles in said grouping station will be removed by a finger as it passes the station and a second non-operative position in which a finger is a lowered position parallel to the surface of the said endless belt so that it will not pick up an article as the grouping station is passed; and means for driving said endless belt conveyor means in which the upstanding fingers are supported on a rigid bar itself attached to said endless belt and in which the upstanding fingers are in the form of inverted U-shaped members with the bridging section of each U section trapped between a cover plate and the bar to provide the hinging joint for the fingers.

13. Apparatus as set forth in claim 12 in which the bridging section between each pair of upstanding fingers is formed with two perpendicular flat surfaces and spring means acts thereagainst to hold the fingers either in the folded-down position or in the folded-up position.

14. Apparatus for counting articles supplied thereto and releasing said articles in groups having the same number of articles in each group comprising in combination:

means for supplying the said articles to a grouping station;

a plurality of guides at the grouping station separating the articles into a corresponding plurality of lines;

conveyor means;

article engaging fingers arranged in lines across the conveyor means for removing from the first position in each of said lines of articles the foremost articles in the lines and conveying the articles so collected to a collating device for dispensing the grouped articles in sequence instead of line abreast;

a stretched endless belt;

means for driving the belt so that it moves in the direction in which the articles are to move through the grouping station, each belt forming part of the article path through the grouping station;

tufts of bristles which are located at intervals along each said endless belt; and means for positioning each belt so that the bristles make a gentle rubbing contact with the underside of articles in the grouping station to gently agitate the articles therethrough.

15. Apparatus as set forth in claim 14 wherein the grouping station comprises a tray formed from a plurality of parallel rails along which the articles can roll and between each pair of which is located one of said endless belts bearing the tufts of bristles.

16. Apparatus as set forth in claim 15 further comprising, in combination, means for adjusting the tray relative to the endless belts to control the contact between the articles and the belts and bristles.

* * * * *